United States Patent
Yilbas et al.

(10) Patent No.: US 8,597,737 B2
(45) Date of Patent: Dec. 3, 2013

(54) METHOD OF CARBO-NITRIDING ALUMINA SURFACES

(75) Inventors: Bekir S. Yilbas, Dhahran (SA); Naser M. Al-Aqeeli, Dhahran (SA); Cihan Karatas, Ivogsan (TR)

(73) Assignee: King Fahd University of Petroleum & Minerals, Dhahran Saudi (SA)

( * ) Notice: Subject to any disclaimer, the term of this patent is extended or adjusted under 35 U.S.C. 154(b) by 0 days.

(21) Appl. No.: 13/400,552

(22) Filed: Feb. 20, 2012

(65) Prior Publication Data

US 2012/0148758 A1   Jun. 14, 2012

Related U.S. Application Data

(62) Division of application No. 12/453,438, filed on May 11, 2009, now Pat. No. 8,142,861.

(51) Int. Cl.
*B05D 3/06* (2006.01)

(52) U.S. Cl.
USPC ............................ 427/554; 427/340; 427/228

(58) Field of Classification Search
USPC ............. 427/530, 554, 340, 228; 204/157.22, 204/157.41
See application file for complete search history.

(56) References Cited

U.S. PATENT DOCUMENTS

| | | | |
|---|---|---|---|
| 4,451,302 A | 5/1984 | Prescott et al. | |
| 4,810,438 A | 3/1989 | Webster et al. | |
| 4,857,246 A | 8/1989 | Bolt | |
| 4,917,877 A | 4/1990 | Oguni et al. | |
| 4,992,253 A | 2/1991 | Wu et al. | |
| 5,145,741 A | 9/1992 | Quick | |
| 5,246,741 A | 9/1993 | Ouhata et al. | |
| 5,451,444 A | 9/1995 | DeLiso et al. | |
| 5,688,320 A | 11/1997 | Gribkov et al. | |
| 6,744,076 B2 | 6/2004 | Fukuyama et al. | |
| 7,216,661 B2 | 5/2007 | Welty et al. | |
| 7,220,314 B2 | 5/2007 | Fukuyama et al. | |
| 7,338,555 B2 | 3/2008 | Fukuyama et al. | |
| 2004/0185666 A1 | 9/2004 | Fukuyama et al. | |
| 2004/0222211 A1 | 11/2004 | Hiramatsu et al. | |
| 2008/0118649 A1 | 5/2008 | Rathenow et al. | |

FOREIGN PATENT DOCUMENTS

FR   2865671   8/2005

OTHER PUBLICATIONS

Yilbas et al, Laser gas assisted nitriding of alumina surfaces, Apr. 2009, Surface Engineering. vol. 25 No. 3, p. 235-240.*
Yongqing Fu et al., "Laser Nitriding of Pure Titanium with Ni, Cr for improved wear performance," Wear,1998, vol. 214, pp. 83-90.

* cited by examiner

*Primary Examiner* — Dah-Wei Yuan
*Assistant Examiner* — Nga Leung V Law
(74) *Attorney, Agent, or Firm* — Richard C. Litman

(57) ABSTRACT

The method of carbo-nitriding alumina surfaces is a process for applying a carbo-nitride coating to an alumina or alumina-based composite surface. The method involves the step of applying a phenolic resin to the alumina surface in a thin, uniform film. The resin-coated alumina surface is maintained in a controlled chamber at about 8 bar pressure at a temperature of about 175° C. for about 2 hours. The surface is then heated at about 400° C. for several hours in an argon atmosphere. This converts the phenolic resin to carbon. The carbon coated alumina surface is then scanned by a laser beam while applying nitrogen under pressure. The end result is the conversion of the alumina at the surface to aluminum carbo-nitride, the oxygen being released in the form of carbon dioxide.

5 Claims, No Drawings

METHOD OF CARBO-NITRIDING ALUMINA SURFACES

CROSS REFERENCE TO RELATED APPLICATION

This application is a division of application Ser. No. 12/453,438, filed May 11, 2009, currently pending.

BACKGROUND OF THE INVENTION

1. Field of the Invention

The present invention relates to processes for coating metals, and particularly to a method of carbo-nitriding alumina surfaces.

2. Description of the Related Art

Nitriding is the process of adding nitrogen to the surface of metals for improved hardness and wear resistance. A nitride coating may be applied to many different metals, including steel and other ferrous metals, titanium, molybdenum, and aluminum. Several processes are known for applying the nitride coating, such as gas nitriding, liquid or salt bath nitriding, and ion or plasma nitriding. Conventional gas nitriding generally uses ammonia, which dissociates to form nitrogen and hydrogen when brought into contact with a heated metal workpiece. Other processes are generally performed at high temperatures and/or pressures, and require substantial periods of time to form the nitride surface to the desired depth.

Laser gas assisted nitriding is a relatively new process for applying a nitride coating to metals. The process generally involves exposing the workpiece to laser radiation for comparatively brief periods in the presence of an inert gas. Nitrogen is supplied under pressure. Laser nitriding has several advantages, including the ability to apply a very thin coating; the ability to apply the coating in a vary narrow beam, if desired; relatively low temperatures and pressures to avoid deformation of the metal; and quick processing times, with exposure to radiation often being less than a second.

Alumina ($Al_2O_3$) finds wide application in industry due to its tribological and thermal properties, such as corrosion resistance and thermal stability at high temperatures. Alumina is widely used in lined process piping, chutes, cyclones, lined metal fabrication, and grinding mill components. This is due to the fact that all of these applications require a unique combination of hardness, extremely high abrasion resistance, and high strength over a broad range of temperatures. Moreover, alumina tiles are formed from fine alumina powders through sintering. The tiles have high porosity, particularly in the surface region. Alumina tiles are, in general, produced from microsized alumina powders. Depending on the powder size, in some cases, structural non-homogeneity and abnormalities, such as scattered small voids, are formed in the tiles. These abnormalities in the structure, particularly in the surface region, can be minimized through controlled laser melting.

However, during the laser melting process, an assisting gas is used to prevent excessive oxidation reactions taking place in the irradiated region. The oxidation reactions are exothermic, increasing the surface roughness and crack formation through subsequent high heating and cooling rates in the irradiated region. The use of the inert gas, such as nitrogen, in the laser melting process prevents surface defects that would otherwise result from high temperature oxidation reactions. Moreover, nitrogen at high temperatures and pressures forms AlN in the surface region, thus modifying the surface hardness.

Carbo-nitriding, or carbonitriding, is a process similar to nitriding, but with carbon being added to the source of nitrogen so that both carbon and nitrogen atoms diffuse interstitially into the metal, creating barriers to slip, and increasing hardness near the surface. The carbo-nitrided surface is usually between 0.07 mm to 0.5 mm thick. Because alumina and alumina-based composites have oxygen incorporated therein, it would be desirable to have a process that produces a hard, wear resistant carbo-nitride surface that is also not prone to developing cracks.

None of the above inventions and patents, taken either singly or in combination, is seen to describe the instant invention as claimed. Thus, a method of carbo-nitriding alumina surfaces solving the aforementioned problems is desired.

SUMMARY OF THE INVENTION

The method of carbo-nitriding alumina surfaces is a process for applying a carbo-nitride coating to an alumina or alumina-based composite surface. The method involves the step of applying a phenolic resin to the alumina surface in a thin, uniform film. The resin-coated alumina surface is maintained in a controlled chamber at about 8 bar pressure at a temperature of about 175° C. for about 2 hours. The surface is then heated at about 400° C. for several hours in an argon atmosphere. This converts the phenolic resin to carbon. The carbon coated alumina surface is then scanned by a laser beam while applying nitrogen under pressure. The end result is the conversion of the alumina at the surface to aluminum carbo-nitride, the oxygen being released in the form of carbon dioxide.

These and other features of the present invention will become readily apparent upon further review of the following specification.

DETAILED DESCRIPTION OF THE PREFERRED EMBODIMENTS

The method of carbo-nitriding alumina surfaces is a process for applying a carbo-nitride coating to an alumina or alumina-based composite surface. The method involves the step of applying a resin containing an organic compound, preferably a phenolic resin, to the alumina surface in a thin, uniform film. The resin-coated alumina surface is maintained in a controlled chamber at about 8 bar pressure at a temperature of about 175° C. for about 2 hours. The surface is then heated at about 400° C. for several hours in an argon atmosphere. This converts the phenolic resin to carbon. The carbon coated alumina surface is then scanned by a laser beam while applying nitrogen under pressure. The end result is the conversion of the alumina at the surface to aluminum carbo-nitride, the oxygen being released in the form of carbon dioxide.

In the first step, addition of fine carbon layer at the tile surface provides the following reaction during the laser heating:

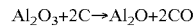

In the second step, introducing nitrogen as an assisting gas provides the following reaction during the laser heating:

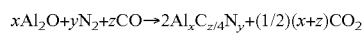

The lesson one learns from the described processes is that when someone needs to carbo-nitride an alumina surface, a carbon film should be formed on the top of alumina tile.

Emanating from this understanding, we would like to provide the following example for an effective method for laser gas assisted carbo-nitriding of alumina surface.

EXAMPLE

First, the phenolic resin was applied to the surface of $Al_2O_3$ tile. A uniform phenolic resin thickness, for example 50 micrometer, was achieved at the tile surface in a control chamber at high pressure, for example, at 8 bar pressure, and at high temperature, for example, 175° C., for some time, for example, two hours. The workpieces were then heated to high temperature, for example, 400° C., in an inert gas environment, for example, argon, for several hours to ensure the conversion of the phenolic resin into carbon.

Second, the carbon coated $Al_2O_3$ tiles were scanned by a $CO_2$ laser beam. The carbon coating of the tile surface was necessary to form $Al_xC_{z/4}N_y$ compound in the surface region. During the laser treatment process, two steps take place. In the first step, addition of a fine carbon layer at the tile surface provided the formation of $Al_2O$. In the second step, introducing nitrogen as an assisting gas provided the formation of $Al_xC_{z/4}N_y$.

It is clear that the disclosed combined process must be carried out discontinuously in two reactors or two steps, due to the different processes.

SEM micrographs of the top surface and a cross section of the carbo-nitrided surfaces shows a smooth, crack-free outer surface and a porous, dendritic carbo-nitrided region below the outer surface.

It is to be understood that the present invention is not limited to the embodiments described above, but encompasses any and all embodiments within the scope of the following claims.

We claim:

1. A method for laser gas assisted carbo-nitriding of an alumina surface, comprising the steps of:
    applying a coating of carbon to the alumina surface; and
    irradiating the carbon coated alumina surface with a laser beam while applying nitrogen under pressure so that aluminum in the alumina surface bonds with the nitrogen to form an aluminum carbo-nitride coating and oxygen in the alumina bonds with the carbon to remove the oxygen as carbon dioxide in order to prevent exothermic oxidation reactions during the carbo-nitriding process.

2. The method for laser gas assisted carbo-nitriding of an alumina surface according to claim 1, wherein said step of applying the coating of carbon further comprises the steps of:
    applying an organic resin to the alumina surface in a thin, uniform film;
    maintaining the resin-coated alumina surface in a controlled chamber at about 8 bar pressure at a temperature of about 175° C. for about 2 hours; and
    thereafter, heating the resin-coated alumina surface at about 400° C. in an inert gas atmosphere to convert the organic resin to carbon.

3. The method for laser gas assisted carbo-nitriding of an alumina surface according to claim 2, wherein the organic resin comprises a phenolic resin.

4. The method for laser gas assisted carbo-nitriding of an alumina surface according to claim 3, wherein the step of applying the organic resin comprises applying the phenolic resin to the alumina surface in a film having a thickness of about 50 μm.

5. The method for laser gas assisted carbo-nitriding of an alumina surface according to claim 3, wherein the step of heating the resin-coated alumina surface is maintained for more than one hour.

* * * * *